United States Patent
Ohyama

(10) Patent No.: US 8,291,223 B2
(45) Date of Patent: Oct. 16, 2012

(54) ARITHMETIC CIRCUIT FOR MONTGOMERY MULTIPLICATION AND ENCRYPTION CIRCUIT

(75) Inventor: Shigeo Ohyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 452 days.

(21) Appl. No.: 12/686,185

(22) Filed: Jan. 12, 2010

(65) Prior Publication Data

US 2010/0183145 A1    Jul. 22, 2010

(30) Foreign Application Priority Data

Jan. 15, 2009   (JP) ................................. 2009-006262

(51) Int. Cl.
*G06F 21/00*   (2006.01)

(52) U.S. Cl. ............. 713/174; 713/172; 380/28; 380/30; 708/603

(58) Field of Classification Search ................ 380/28, 380/30; 713/172, 174, 400; 726/9; 708/603
See application file for complete search history.

(56) References Cited

U.S. PATENT DOCUMENTS

| | | | | |
|---|---|---|---|---|
| 6,026,421 | A * | 2/2000 | Sabin et al. .................. | 708/523 |
| 6,614,909 | B1 * | 9/2003 | Ryu et al. .......................... | 380/30 |
| 6,963,644 | B1 * | 11/2005 | Matsuzaki et al. .............. | 380/30 |
| 2002/0074391 | A1 | 6/2002 | Takano et al. | |
| 2004/0054705 | A1 * | 3/2004 | Le Quere ..................... | 708/491 |
| 2004/0167952 | A1 * | 8/2004 | Gueron et al. ................ | 708/492 |
| 2005/0165876 | A1 * | 7/2005 | Mukaida et al. .............. | 708/523 |
| 2009/0043836 | A1 * | 2/2009 | Dupaquis et al. ............. | 708/607 |

FOREIGN PATENT DOCUMENTS

JP       2002-207589 A       7/2002

OTHER PUBLICATIONS

Wu et al., Resource Efficient Hardware Design for RSA, 2006, In Proceedings of the First International Multi-Symposiums on Computer and Computational Sciences—vol. 2 (IMSCCS'06), IEEE Computer Society, Washington, DC, USA, 64-68.*

Zheng et al., "Design and Implementation of an Ultra Low Power RSA Coprocessor," 2008, Wireless Communications, Networking and Mobile Computing, 2008. WiCOM '08.*

* cited by examiner

*Primary Examiner* — Eleni Shiferaw
*Assistant Examiner* — Hilary Branske
(74) *Attorney, Agent, or Firm* — Birch, Stewart, Kolasch & Birch, LLP

(57) ABSTRACT

An arithmetic circuit capable of Montgomery multiplication using only a one-port RAM is disclosed. In a first read process, b[i] is read from a memory M2 of a sync one-port RAM for storing a[s−1: 0] and b[s−1: 0] and stored in a register R1. In a second read process, a[j] is read from the memory M2, t[j] from a memory M1 of a sync one-port RAM for storing t[s−1: 0], b[i] from the register R1, and a value RC from a register R2, and input to a sum-of-products calculation circuit for calculating t[j]+a[j]*b[i]+RC. In a write process, the calculation result data $F_H$ is written in the register R2, and the calculation result data $F_L$ in the memory M1 as t[j]. A first subloop process for repeating the second read process, the sum-of-products calculation process and the write process is executed after the first read process.

4 Claims, 11 Drawing Sheets

Fig. 5A  READ Timing
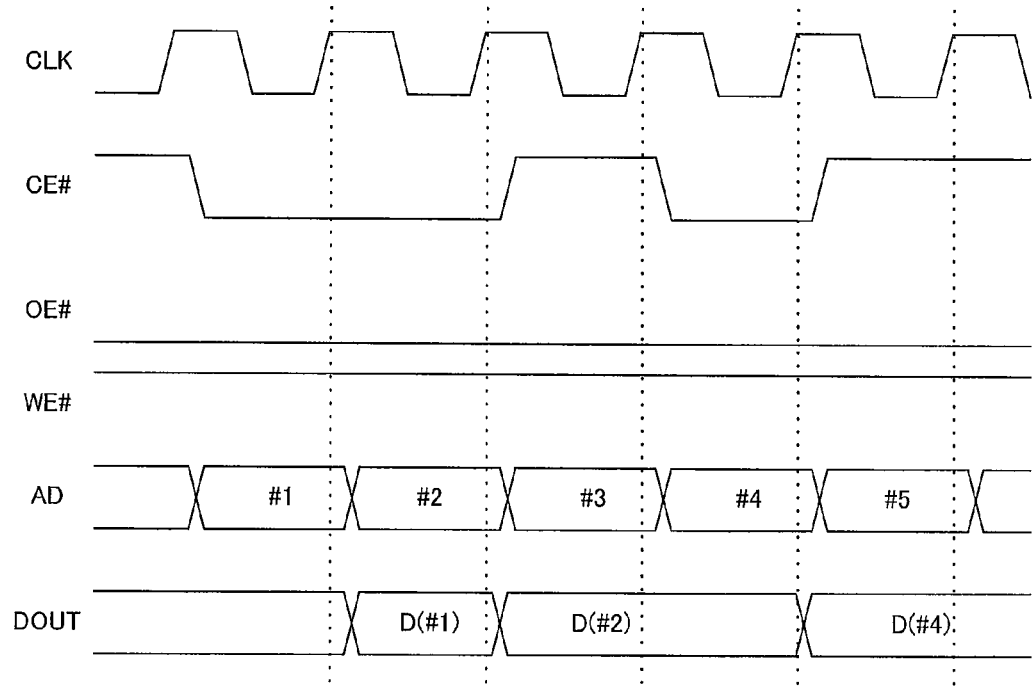
Fig. 5B  WRITE Timing
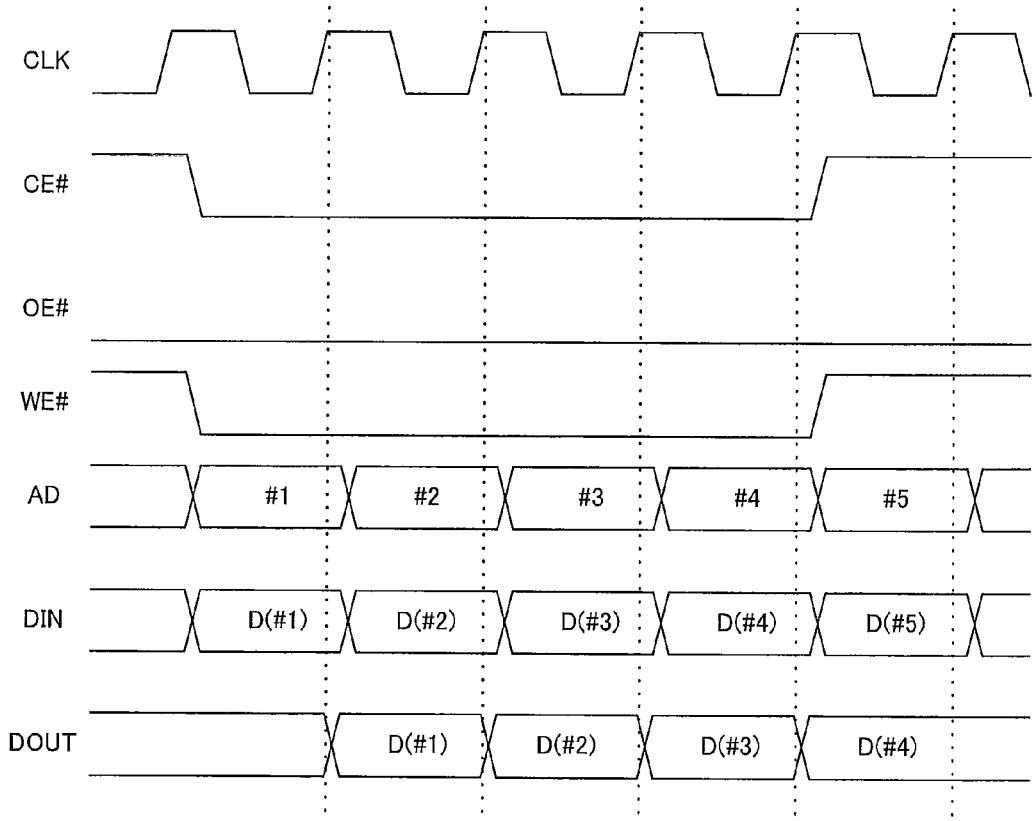

```
for i=0 to s-1
    C := 0
    for j=1 to s-1
        (C, S) := t[j] + a[j]*b[i] + C    ⎫ First Subloop Process
        t[j] := S                          ⎭
    (C, S) := t[s] +C
    t[s] := S
    t[s+1] := C
    C:= 0
    m := t[0]*n'[0] mod W
    (C, S) := t[0] + m*n[0]
    for j=1 to s-1
        (C, S) := t[j] + m*n[j] + C       ⎫ Second Subloop Process
        t[j-1] := S                        ⎭
    (C, S) := t[s] + C
    t[s-1] := S
    t[s] := t[s+1] +C
```

1 Loop Cycle: Memory Read Cycle | Register Write Cycle | Calculation Process Cycle | Memory Write Cycle | Memory Read Cycle ...

Fig. 11B
Prior Art

1 Loop Cycle: Memory Read Cycle | Register Write Cycle | Calculation Process & Memory Write Cycle | Memory Read Cycle | Register Write Cycle | Calculation Process & Memory Write Cycle | Memory Read Cycle ...

ARITHMETIC CIRCUIT FOR MONTGOMERY MULTIPLICATION AND ENCRYPTION CIRCUIT

CROSS REFERENCE TO RELATED APPLICATION

This Nonprovisional application claims priority under 35 U.S.C. §119(a) on Patent Application No. 2009-006262 filed in Japan on 15 Jan. 2009 the entire contents of which are hereby incorporated by reference.

BACKGROUND OF THE INVENTION

1. Field of the Invention

This invention relates to an arithmetic circuit for Montgomery multiplication and an encryption circuit for executing encryption and decryption processes using the arithmetic circuit for Montgomery multiplication.

2. Description of the Related Art

An electronic commercial transaction for signing a contract or settling an account using a network such as an internet is conducted by, for example, an electronic shop to sell commodities on the network (commercial transaction between enterprises and consumers). Through this electronic commercial transaction, the consumers can select a commodity by browsing a Web site of the electronic shop and purchase it by designating a method of settlement.

In this electronic commercial transaction, a problem is how to prevent an impersonation, wiretapping or alteration to maintain security. As an authentication technique for preventing the impersonation, for example, a public key cryptosystem is used. In the public key cryptosystem, two different keys are used for encryption and decryption, and it is very difficult or impossible to estimate the decryption key from the encryption key or decode the encrypted text. The key holder places the encryption key (public key) in public domain, and by managing the decryption key (private key) in a manner unknown to a third party, information on the other party of transaction using the public key can be kept confidential from the third party.

The commercial transaction between the electronic shop and the consumer described above, for example, is conducted in such a manner that the electronic shop places the encryption key (public key) in public domain and manages the decryption key (private key) in a way unknown to the third party. The consumer, using the encryption key (public key) placed in public domain by the electronic shop, encrypts and transmits information on the commercial transaction to the electronic shop. The encrypted text received from the consumer is decrypted by the electronic shop using the decryption key (private key) and the commodity is sold to the consumer. The electronic shop holding the key, by managing the decryption key (private key) in a manner unknown to the third party, can prevent both the information on the commercial transaction and personal information of the consumer from being leaked to the third party.

An example of the public key cryptosystem is a RSA (Rivest Shamir Adleman) cryptosystem. The decryption of the RSA cryptography requires the prime factorization of a very large integer, and cannot be accomplished within a realistic computation time even by the computer.

The RSA encryption and decryption methods are briefly explained below.

Assume that a plain text M is encrypted using a public key (e, n). An encrypted text C is generated according to Equation (1) below.

$$C = M^e \bmod n \; (0 \leq M < n) \qquad (1)$$

In a case where the encrypted text C is decrypted using a private key (d, n), on the other hand, the plain text M is generated according to Equation (2) below.

$$M = C^d \bmod n \qquad (2)$$

Incidentally, the public key (e, n) and the private key (d, n) hold the relation shown by Equation (3) below.

$$n = p \times q \; (p, q: \text{prime number})$$

$$e \times d \equiv 1 \bmod (p-1)(q-1) \qquad (3)$$

Specifically, assume that p=3, q=11, e=3 and d=7. In the encrypted text C obtained by encrypting the plain text M (=7) is given as $C = 7^3 \bmod(3 \times 11) = 343 \bmod 33 = 13$ from Equation (1).

Also, according to Equation (2), the plain text M obtained by decryption of the encrypted text C (=13) is given as $M = 13^7 \bmod 33 = 62748517 \bmod 33 = 7$. It is therefore understood that the encryption and decryption according to Equations (1) and (2) are correctly carried out.

In the RSA cryptosystem described above, power calculation and surplus calculation are carried out as indicated by Equations (1) and (2). Generally, the key and the plain text have as large a number of digits of not less than 1024 bits, and therefore, an overflow may be caused if the encryption or decryption is carried out using Equations (1) and (2) as they are on an arithmetic unit.

In the encryption and decryption by the RSA cryptosystem, therefore, the Montgomery multiplication is used as an example of the surplus computation method which causes no overflow. In the Montgomery multiplication, the surplus calculation of N bits can be carried out in a N-bit memory space.

The Montgomery multiplication is explained briefly below.

A right side of the equation $1C = M^e$ mod n of the RSA cryptosystem can be determined by the sequential calculation such as $M^2 \bmod n = M \times M \bmod n$, $M^3 \bmod n = M \times M^2 \bmod n$, ..., $M^e \bmod n = M \times M^{e-1} \bmod n$. In other words, the calculation is possible by repeating the operation $\gamma = \alpha \times \beta \bmod n$.

The Montgomery multiplication, which is carried out on the computer, uses a constant $R = 2^N$. Two sides of $\gamma = \alpha \times \beta \bmod n$ are multiplied by R to determine modn, and then, the relation holds that $\gamma R \bmod n = \alpha R \times \beta R \times R^{-1} \bmod n$. Assume that $Z = \gamma R \bmod n$, $A = \alpha R \bmod n$ and $B = \beta R \bmod n$. Then, the calculation for Montgomery multiplication is given by Equation (4) below.

$$Z = A \times B \times R^{-1} \bmod n \qquad (4)$$

FIG. 9 shows an example of a program code (pseudo code) for computation of the Montgomery multiplication of Equation (4) on the arithmetic unit.

In the RSA cryptosystem, the plain text M has so large a number of bits (1024 bits, etc.), and therefore, each of variables A, B, n for the Montgomery multiplication used in the encryption according to the RSA cryptosystem also has a very large number of bits. For the Montgomery multiplication to be conducted on the arithmetic unit, therefore, the variables A, B, n are required to be divided by a bit width r so as to be calculable by the arithmetic unit. Specifically, assume that the variables A, B, n have the same bit width, and define s as the number of divisions. Then, the relations hold that $A = \{a[s-1], a[s-2], \ldots, a[0]\}$, $B = \{b[s-1], b[s-2], \ldots, b[0]\}$, $n = \{n[s-1], n[s-2], \ldots, n[0]\}$ and $N = r \times s$.

Also, in FIG. 9, (C, S) indicates variables for storing the calculation result, in which the variable C indicates a most significant r bits of (C, S) and the variable S a least significant r bits of (C, S). On the other hand, t[s+1], t[s], ..., t[0] and m indicate temporary variables of the bit width r.

As understood from FIG. 9, the calculation formula (C, S):=t[j]+a[j]*b[i]+C is located inside a subloop of a main loop and shows the greatest number of times the computation is made as indicated by ((s−1)×(s−1)). In order to increase a speed of encryption and decryption in the RSA cryptosystem, therefore, a computation of (C, S):=t[j]+a[j]*b[i]+C in the Montgomery operation is required to be increased in speed. Incidentally, the sign * in FIG. 9 designates the multiplication (×).

As an arithmetic unit for carrying out the Montgomery multiplication at a high speed, Japanese Unexamined Patent Publication No. 2002-207589, for example, proposes an arithmetic circuit including a calculator configured by first to fourth registers to store variables $x_1$, $x_2$, $x_3$, $x_4$, respectively, having a bit width r, a memory A configured by a two-port RAM (random access memory), a memory B configured by a two-port or one-port RAM, and a calculator adapted to accept the variables $x_1$, $x_2$, $x_3$, $x_4$ from the first to fourth registers, and by calculating the sum of the product of the variable $x_1$, the variable $x_2$ and the variable $x_3$ and the variable $x_4$, execute a pipelining process to output the calculation result Q of a bit width 2r or 2r+1, wherein after executing the pipelining process, a memory write process is executed to write data $Q_L$ including the least significant r bits of the calculation result Q in the memory A and data $Q_H$ including the most significant r bits of the calculation result in the fourth register, and wherein a memory read process is executed to read and output the variable $x_1$ from the memory A to the first register and the variable $x_3$ from the memory B to the third register.

FIG. 10 shows an example of a general configuration of the arithmetic circuit described in Japanese Unexamined Patent Publication No. 2002-207589. FIG. 11A shows a flow of a memory read process (memory read cycle) and a memory write process (memory write cycle) serially executed, and FIG. 11B shows a flow of a memory read process and a memory write process executed by pipelining in the configuration described in Japanese Unexamined Patent Publication No. 2002-207589 with the memory B configured by a two-port RAM.

As understood from FIGS. 11A and 11B, the arithmetic circuit described in Japanese Unexamined Patent Publication No. 2002-207589 can execute the memory read process and the memory write process by pipelining, and therefore, can increase an operation speed as compared with a case in which the memory read process and the memory write process are executed serially.

In a case where the Montgomery multiplication is carried out by an arithmetic circuit implemented by, for example, an ASIC (application specific integrated circuit), however, the two-port RAM often fails to be supported by a standard ASIC library. The two-port RAM, even if so supported, is sometimes limited to the one having a large area according to a 2-read/2-write system. From the viewpoint of circuit design standardization and the realization of IP (intellectual property), it is undesirable to use a two-port RAM often failing to be supported positively.

SUMMARY OF THE INVENTION

This invention is achieved in view of the problems described above, and an object thereof is to provide an arithmetic circuit adapted to perform Montgomery multiplication using only a one-port RAM, or in particular, a RSA encryption circuit adapted to perform the Montgomery multiplication using only a one-port RAM.

In order to achieve the aforementioned object, according to a first aspect of the invention, there is provided an arithmetic circuit for performing the Montgomery multiplication, comprising: a sum-of-products calculation circuit adapted to execute a sum-of-products calculation process to accept first, second, third and fourth variables of a bit width r, and calculate the sum of the third variable, the product of the first and second variables and the forth variable thereby to output the calculation result data of a bit width 2r; a first memory configured by a synchronous one-port RAM having a storage area for storing an intermediate result storage array of a bit width r and the number s of elements, and adapted to output each element of the intermediate result storage array as the third variable to the sum-of-products calculation circuit; a second memory configured by a synchronous one-port RAM having a storage area for storing first and second arrays of a bit width r and the number s of elements, and adapted to output each element of the first array as the first variable to the sum-of-products calculation circuit; a multiplicand storage register adapted to accept and store the second array from the second memory in units of element, and output each element of the second array as the second variable to the sum-of-products calculation circuit; and a carry register adapted to accept and store most significant bit-side data including most significant r bits of the calculation result data, and output the most significant bit-side data as the fourth variable to the sum-of-products calculation circuit, the arithmetic circuit executing: a first read process for reading the elements of the second array indicated by a predetermined first loop counter value from the second memory, and storing the elements in the multiplicand storage register; a second read process for reading the elements of the first array indicated by a predetermined second loop counter value from the second memory, the elements of the intermediate result storage array indicated by the second loop counter value from the first memory, a value of the multiplicand storage register and a value of the carry register, and inputting each of the read out elements and values to the sum-of-products calculation circuit; and a write process for writing the most significant bit-side data in the carry register and least significant bit-side data including least significant r bits of the calculation result data in the first memory as the elements of the intermediate result storage array indicated by the second loop counter value, wherein the first read process is followed by a first subloop process for repeatedly executing the second read process, the sum-of-products calculation process, the write process and a process of updating the second loop counter value in that order.

According to a second aspect of the invention, there is provided an arithmetic circuit for Montgomery multiplication, wherein the second memory further includes a storage area for storing a third array of a bit width r with the number s of the elements and a multiplicand variable of a bit width r, and is adapted to output each element of the third array to the sum-of-products calculation circuit as each corresponding element of the first array, and output the multiplicand variable to the multiplicand storage register as each element of the second array.

According to a third aspect of the invention, there is provided an arithmetic circuit for Montgomery multiplication, wherein a second subloop process is executed to repeat the second read process using each element of the third array as each corresponding element of the first array, the sum-of-products calculation process, the write process and the process of updating the second loop counter value in that order, and a main loop process is executed to repeat at least the normal first read process, the first subloop process, another first read process using the multiplicand variable as each element of the second array, the second subloop process and a process of updating the first loop counter value in that order.

In order to achieve the object described above, according to still another aspect of the invention, there is provided a RSA encryption circuit executing at least one of the RSA encryption process and the decryption process thereof using the arithmetic circuits for Montgomery multiplication according to the first to third aspects.

The arithmetic circuit for Montgomery multiplication according to the first aspect is configured by only a one-port RAM without using a two-port RAM. In configuring an encryption circuit for encryption and decryption with ASIC, therefore, a highly versatile circuit can be implemented without depending on an ASIC library. As a result, the arithmetic circuit for Montgomery multiplication according to the first aspect described above is more useful to standardize and realize IP for the arithmetic circuit for Montgomery multiplication.

Also, the arithmetic circuit for Montgomery multiplication according to each aspect described above is configured to execute the write process in such a manner that among the calculation result data output from the sum-of-products calculation circuit, the most significant bit-side data is written in the carry register and the least significant bit-side data in the first memory. By controlling the sum-of-products calculation process and the write process to be executed in parallel, therefore, the calculation speed of the circuit as a whole can be increased.

BRIEF DESCRIPTION OF THE DRAWINGS

FIG. 5A is a READ timing chart for explaining an operation of the synchronous one-port RAM;

FIG. 5B is a WRITE timing chart for explaining an operation of the synchronous one-port RAM;

FIG. 9 is a diagram showing a program code for explaining an operation of the arithmetic unit for performing the Montgomery calculation;

FIG. 11A is a schematic diagram showing a processing flow in a case where a memory read process is executed serially an in pipelining fashion in the conventional arithmetic circuit; and FIG. 11B is a schematic diagram showing a processing flow in a case where a memory write process is executed serially an in pipelining fashion in the conventional arithmetic circuit.

DETAILED DESCRIPTION OF THE INVENTION

An arithmetic circuit for Montgomery multiplication according to the invention (hereinafter referred to as "the invented circuit") and a RSA encryption circuit according to an embodiment of the invention are explained below with reference to the drawings.

The invented circuit and the RSA encryption circuit using the invented circuit according to an embodiment are explained with reference to FIGS. 1 to 8.

Figure 1:
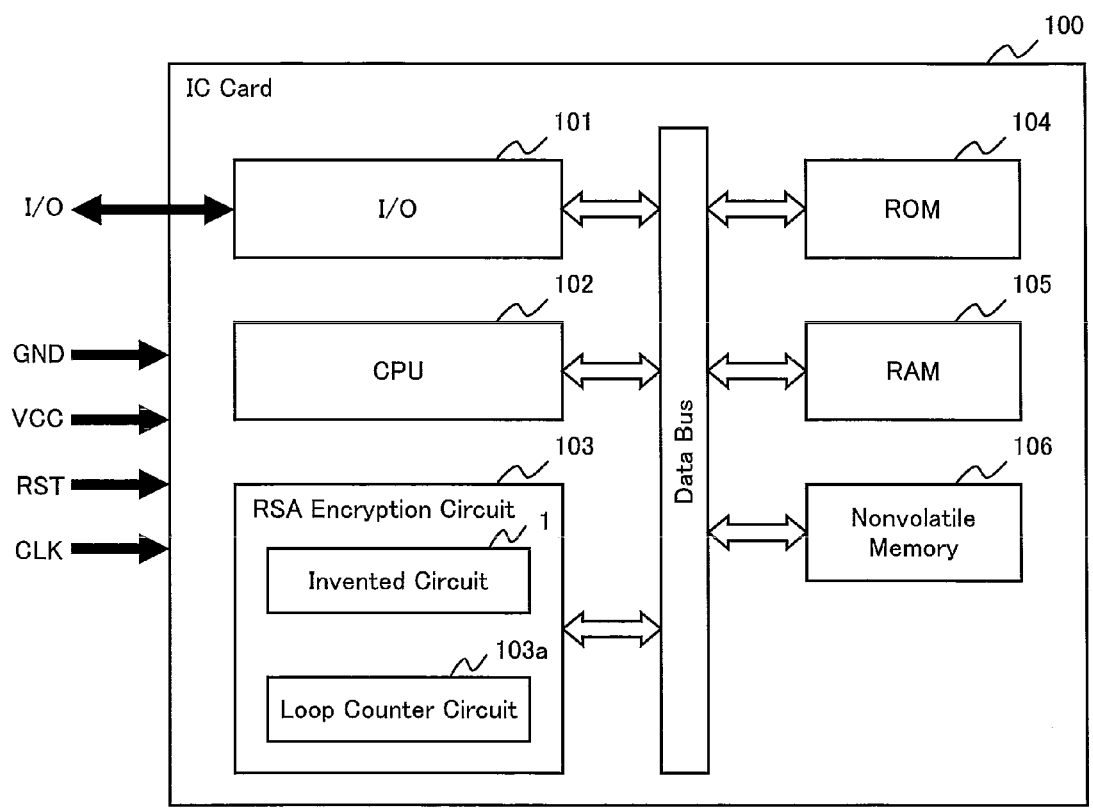
FIG. 1 is a block diagram showing an example of a general configuration of parts of an IC card including a RSA encryption circuit using an arithmetic circuit for Montgomery multiplication according to this invention.
Figure 3:
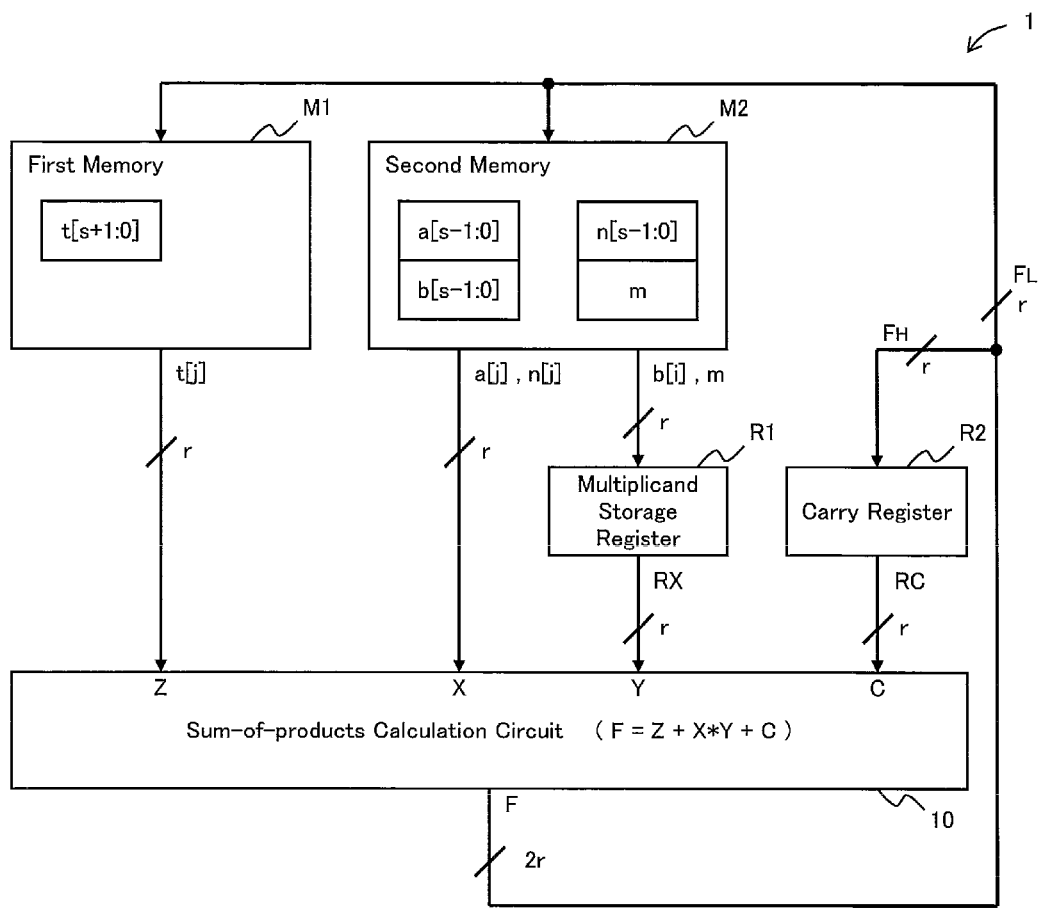
FIG. 3 is a block diagram showing an example of a general configuration of the arithmetic circuit for Montgomery multiplication according to this invention.

FIG. 1 shows an example of a general configuration of an IC card 100 including a RSA circuit 103 configured by an invented circuit 1, and FIG. 3 shows an example of a general configuration of the invented circuit 1.

According to this embodiment, the IC card 100 is of contact type, and as shown in FIG. 1, includes an I/O (input/output) unit 101 for conducting a data communication with an IC card reader, a CPU (central processing unit) 102 for controlling each function in the IC card 100, a ROM (read-only memory) 104 for storing programs to realize the functions of the IC card 100, a RAM 105, a nonvolatile memory 106 such as a flash memory and a RSA encryption circuit 103 for executing a encryption process or the like by the RSA cryptosystem. Although the IC card of contact type is assumed in this embodiment, an IC card of non-contact type may alternatively be used.

Also, in a case where the IC card 100 according to this embodiment sends transmission data containing security information such as personal information to the IC card reader in data communication therewith, the transmission data is encrypted using the RSA encryption circuit 103.

According to this embodiment, the RSA encryption circuit 103 is implemented by ASIC, and with the invented circuit 1 and a loop counter circuit 103a, configured to execute the encryption process for the transmission data containing the security information. According to this embodiment, the loop counter circuit 103a is configured by a first counter circuit (not shown) for generating, of all the count values used for a program code shown in FIG. 9, a first loop counter value i to control the number of times a main loop process is executed, and a second counter circuit (not shown) for generating, of all the count values used for the program code shown in FIG. 9, a second loop counter value j to control the number of times the subloop process is executed.

Figure 2:
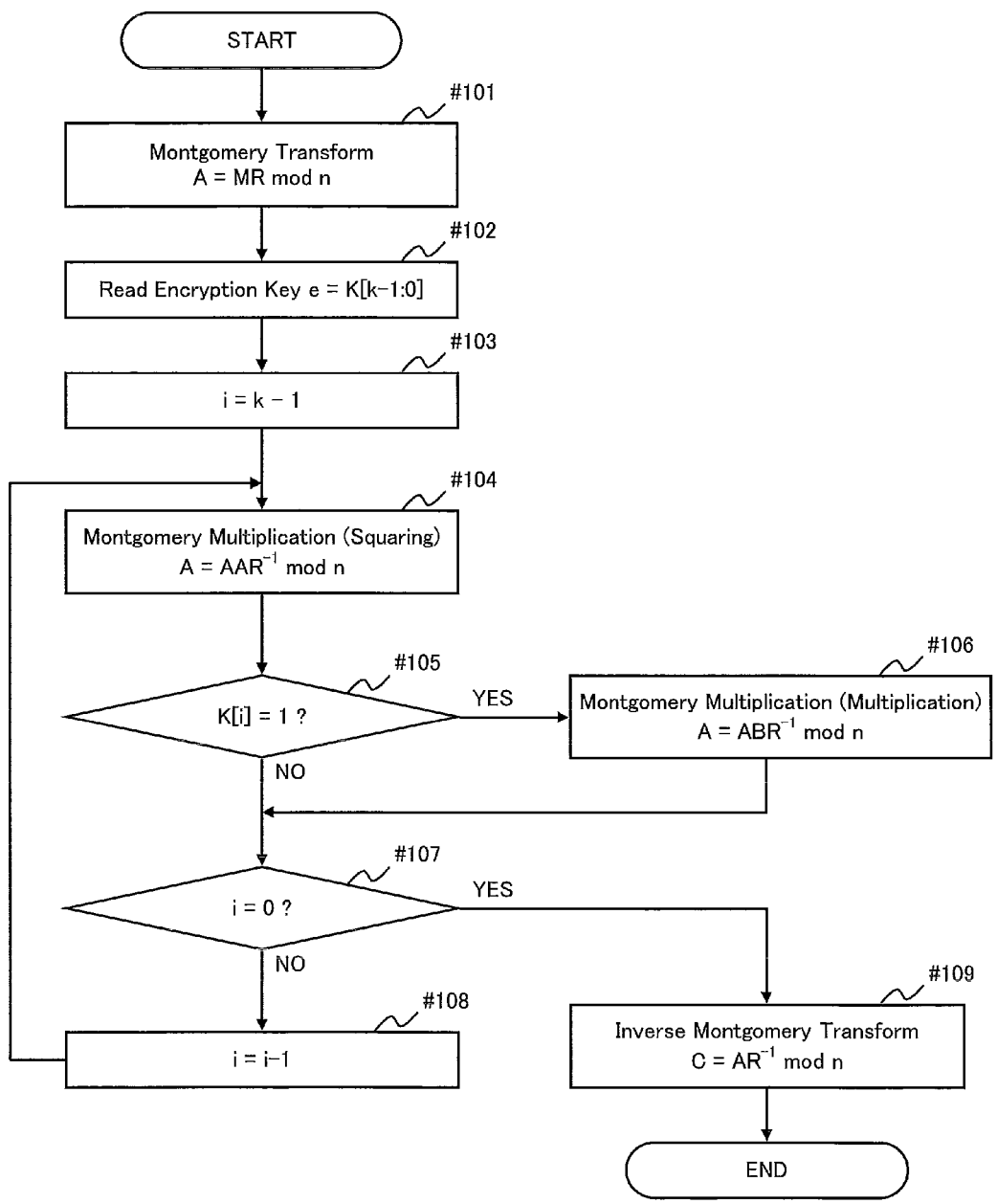
FIG. 2 is a flowchart showing a processing algorithm for the RSA encryption circuit according to the invention.

FIG. 2 shows a processing algorithm of the RSA encryption circuit 103 according to this embodiment. Specifically, the RSA encryption circuit 103 first performs the Montgomery transform using a plain text M and a constant R ($=2^N$) (step #101), reads an encryption key e ($=K[k-1:0]$) (#102), and initializes the value of the variable i to (k−1) (step #103). After that, the invented circuit 1 conducts the Montgomery multiplication as the squaring expressed by $A=AAR^{-1} \bmod n$ (step #104). In a case where K[i] is 1 (YES in step #105), the invented circuit 1 conducts the Montgomery multiplication as the multiplication expressed by $A=ABR^{-1} \bmod n$ (step #106). In a case where the variable i is not 0 (NO in step #107), on the other hand, 1 is subtracted from i (step #108), followed by proceeding to step #104. In a case where the variable i is 0

(YES in step #107), on the other hand, an inverse Montgomery transform expressed by $C=AR^{-1} \bmod n$ is conducted (step #109) thereby to end the process.

The invented circuit 1 is configured to execute the process indicated by the program codes in FIG. 9. As shown in FIG. 3, the invented circuit 1 includes a sum-of-products calculation circuit 10 to accept a first variable X, a second variable Y, a third variable Z and a fourth variable C, execute the sum-of-products calculation process by calculating the sum ($F=Z+X*Y+C$) of the third variable Z, the product of the first variable X and the second variable Y and the fourth variable C, and output the calculation result data F of a bit width 2r; a first memory M1 configured by a synchronous one-port RAM having a storage area to store the intermediate result storage array t of a bit width r and the number s of elements to output each element of the intermediate result storage array t as the third variable Z to the sum-of-products calculation circuit 10; a second memory M2 configured by a synchronous one-port RAM having a storage area to store a first array a[s−1: 0] and a second array b[s−1: 0] of a bit width r and the number s of the elements to output each element of the first array a[s−1: 0] as the first variable X to the sum-of-products calculation circuit 10; a multiplicand storage register R1 for accepting and storing the second array b[s−1: 0] from the second memory M2 in units of elements to output each element of the second array as the second variable Y to the sum-of-products calculation circuit 10; and a carry register R2 for accepting and storing most significant bit-side data $F_H$ including most significant r bits in the calculation result data F to output it as the fourth variable C to the sum-of-products calculation circuit 10.

This embodiment is explained on the assumption that the invented circuit 1 is configured to execute the main loop process including a first subloop process and a second subloop process shown in FIG. 9. Nevertheless, the invented circuit 1 may alternatively be configured for each subloop process.

More specifically, the first memory M1 according to this embodiment includes a storage area adapted to store the intermediate result storage array t[s+1: 0] with the number "s+2" of elements. This embodiment is configured to use t[s−1: 0] of the intermediate result storage array t to execute the first and second subloop processes, and t[s] and t[s+1] to execute the main loop process.

Figure 4:
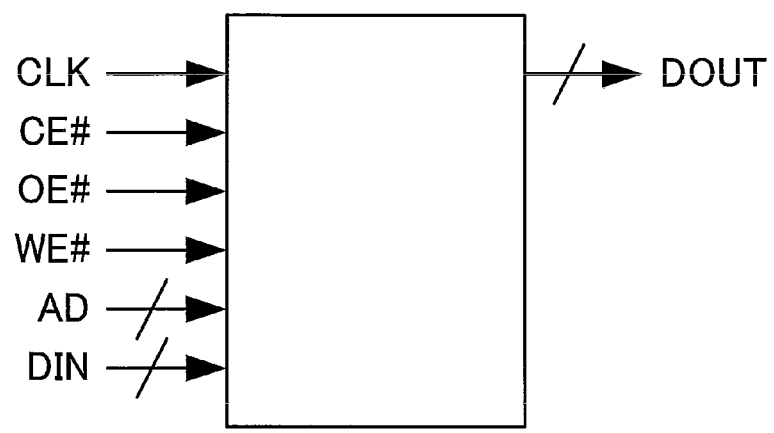
FIG. 4 is a block diagram showing an example of a general configuration of a synchronous one-port RAM.

Now, FIG. 4 shows an example of a general configuration of the first memory M1 and the second memory M2 according to this embodiment. Also, FIG. 5A shows an operation timing of a read process for the first memory M1 and the second memory M2 according to this embodiment, and FIG. 5B shows an operation timing of a write process for the first memory M1 and the second memory M2 according to this embodiment. The first memory M1 constituting the synchronous one-port RAM, as shown in FIG. 5A, operates in synchronism with a clock signal CLK in the read process in such a manner that in a case where a chip enable signal CE# is at a low level, data D stored in the storage area indicated by an address signal AD is output from an output terminal DOUT. In similar fashion, the first memory M1, as shown in FIG. 5B, operates in synchronism with the clock signal CLK in the write process in such a manner that in the case where the chip enable signal CE# is at L level, the data D input from a data input terminal DIN is written in the storage area indicated by the address signal AD.

Incidentally, according to this embodiment, the number of elements of the intermediate result storage array t is set to "s+2" for the main loop process. In a case where the invented circuit is configured to execute only the subloop process, however, the number of elements of the intermediate result storage array t may alternatively be set to s. Also, the first memory M1 may be configured to store variables other than the intermediate result storage array t.

In addition to the storage area for storing the first array a[s−1: 0] and the second array b[s−1: 0] for executing the first subloop process, the second memory M2 according to this embodiment further includes the storage area for storing the third array n[s−1: 0] of the bit width r and the number s of elements and the multiplicand variable m of the bit width r to execute the second subloop process shown in FIG. 9.

In the second subloop process, the second memory M2 is configured to output each element of the third array n[s−1: 0] as a corresponding element of the first array a[s−1: 0] to the sum-of-products calculation circuit 10 on the one hand, and output multiplicand variable m as each element of the second array b[s−1: 0] to the multiplicand storage register R1 on the other hand. Incidentally, the second memory M2 has the same configuration (FIG. 4) and operates at the same operation timing FIGS. 5A and 5B) as the first memory M1.

The invented circuit 1 is configured in a way adapted to execute: a first read process (normal first read process) for reading the elements of the second array b[s−1: 0] indicated by a first loop counter value i from the second memory M2 and storing it in the multiplicand storage register R1; a second read process for reading the elements of the first array a[s−1: 0] indicated by a second loop counter value j from the second memory M2, reading the elements of the intermediate result storage array t indicated by the second loop counter value j from the first memory M1, reading a value RX of the multiplicand storage register R1, reading a value RC of the carry register R2 and inputting each of these values to the sum-of-products calculation circuit 10; and a write process for writing the most significant bit-side data $F_H$ in the carry register R2, and writing, in the first memory M1, least significant bit-side data $F_L$ having a least significant r bits of the calculation result data F as the elements of the intermediate result storage array t indicated by the second loop counter value j. Also, the invented circuit 1 is configured to execute, after execution of the first read process, a first subloop process for repeatedly executing the second read process, the sum-of-products calculation process, the write process and the process of updating the second loop counter value j.

Further, the invented circuit 1 is configured to execute a second subloop process to repeat the second read process using each element of the third array n[s−1: 0] as a corresponding element of the first array a[s−1: 0], the sum-of-products calculation process, the write process and the process of updating the second loop counter value j.

The invented circuit 1, in order to execute a program codes shown in FIG. 9, is so configured to execute a main loop process in which at least the normal first read process, the first subloop process, another first read process using the multiplicand variable m as each element of the second array b[s−1: 0], the second subloop process and the process of updating the first loop counter value i are repeatedly executed in that order.

Figure 6:
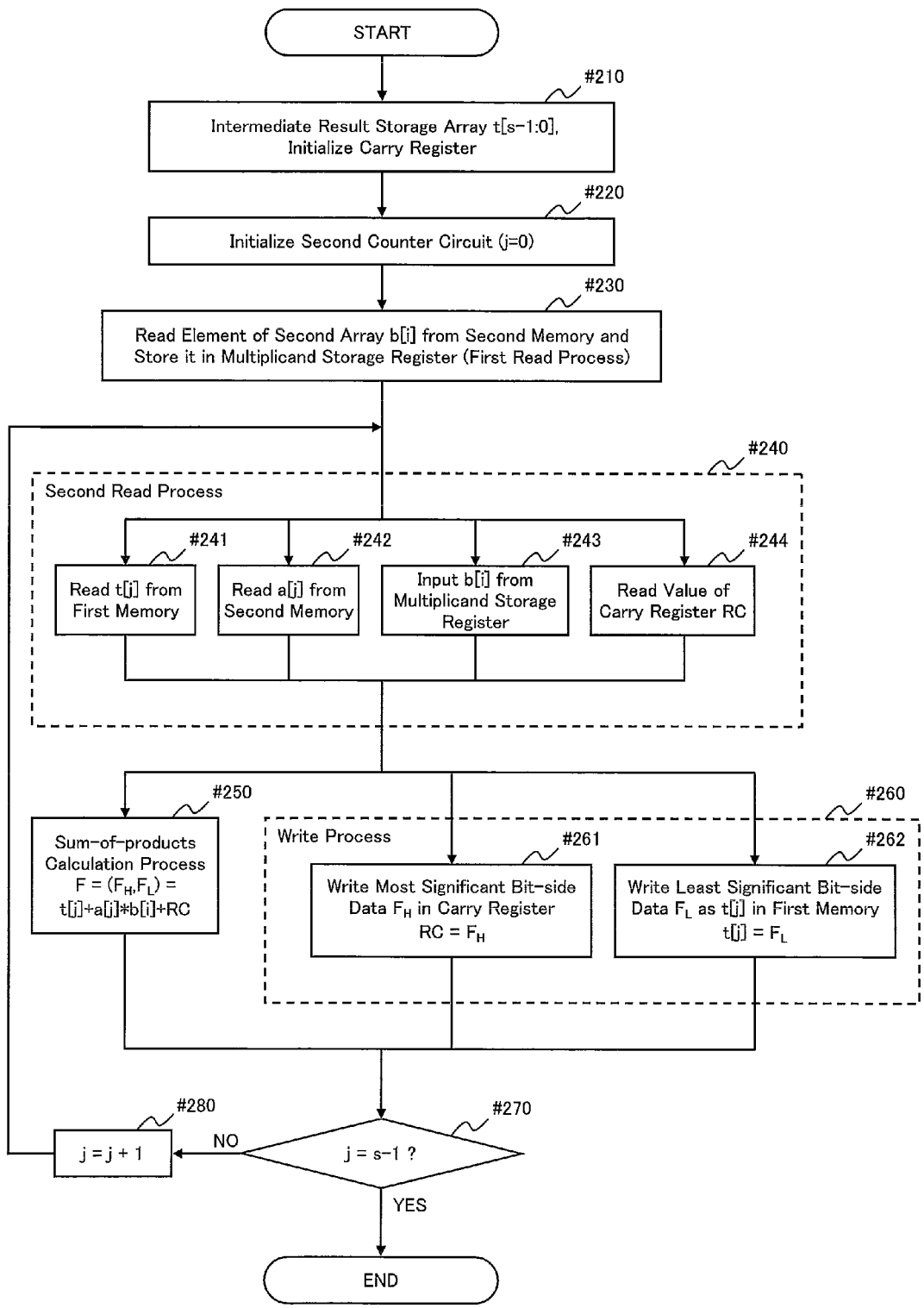
FIG. 6 is a flowchart showing a processing algorithm for a first subloop process among the processing algorithms of the arithmetic circuit for Montgomery multiplication according to the invention.
Figure 7:
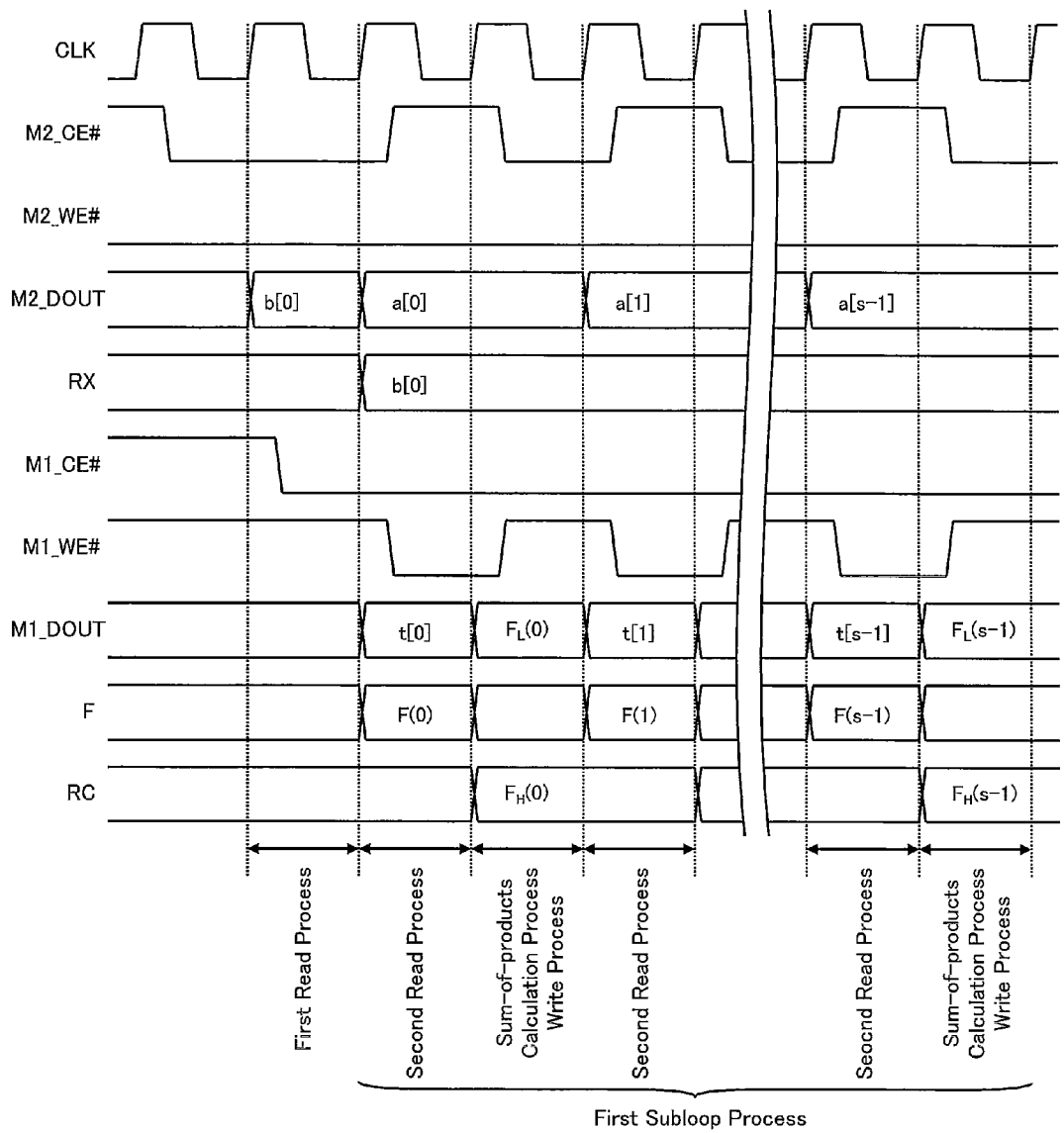
FIG. 7 is a timing chart for explaining an operation of the first subloop process among the processing algorithms of the arithmetic circuit for Montgomery multiplication according to the invention.

FIG. 6 shows a processing algorithm for the first subloop process executed the greatest number of times among the program codes shown in FIG. 9, and FIG. 7 shows a operation timing of each circuit making up the invented circuit 1 with the first subloop process executed. In FIG. 7, Mn_CE# (n=1, 2) designates a chip enable signal of the first memory M1 and the second memory M2, Mn_WE# designates respective write enable signals of the first memory M1 and the second memory M2, and Mn_DOUT designates respective output signal values of the first memory M1 and the second memory M2.

Once the first subloop process is started, the invented circuit 1 first initializes t[s−1: 0] in the intermediate result storage array t of the first memory M1 and also initializes the value RC of the carry register R2 to 0 (step #210). Then, the second counter circuit is initialized to set the second loop counter value j to 0 (step #220). Immediately after that, the invented circuit 1 reads b[i] from the second memory M2 and stores it in the multiplicand storage register R1 (step #230; first read process).

After that, the invented circuit 1 reads t[j] from the first memory M1 (step #241), reads a[j] from the second memory M2 (step #242), reads the value RX (=b[i]) of the multiplicand storage register R1 (step #243), reads the value RC of the carry register R2 (step #244), and inputs each of the values to the sum-of-products calculation circuit 10 (step #240; second read process). Incidentally, steps #241 to #244 are executed in parallel.

After execution of the second read process in step #240, the sum-of-products calculation circuit 10 of the invented circuit 1 calculates t[j]+a[j]*b[i]+RC using each input value in step #240, and outputs the result thereof as a 2r-bit result data F (step #250; sum-of-products calculation process). Further, the invented circuit 1 executes the write process (step #260) by writing the previous most significant bit-side data $F_H$ (initial value of zero for i=0, j=0) in the carry register R2 (step #261) while at the same time writing the least significant bit-side data $F_L$ (initial value of zero for i=0, j=0) as t[j] in the first memory M1 (step #262). Incidentally, the sum-of-products calculation process in step #250 and the write process in step #260 are executed in parallel to each other.

Immediately after that, assume that the second loop counter value j is not "s−1" (NO in step #270). The second loop counter value j is incremented by one (step #280), and the process proceeds to step #240. In a case where the second loop counter value j is "s−1" (YES in step #270), the invented circuit 1 ends the first subloop process.

Figure 8:
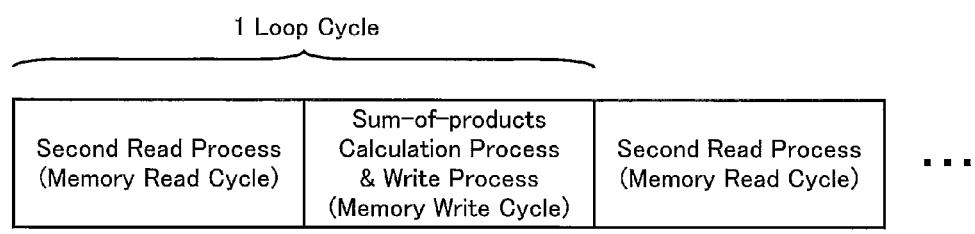
FIG. 8 is a schematic diagram showing a flow of the first subloop process among the processing algorithms of the arithmetic circuit for Montgomery multiplication according to this invention.
Figure 10:
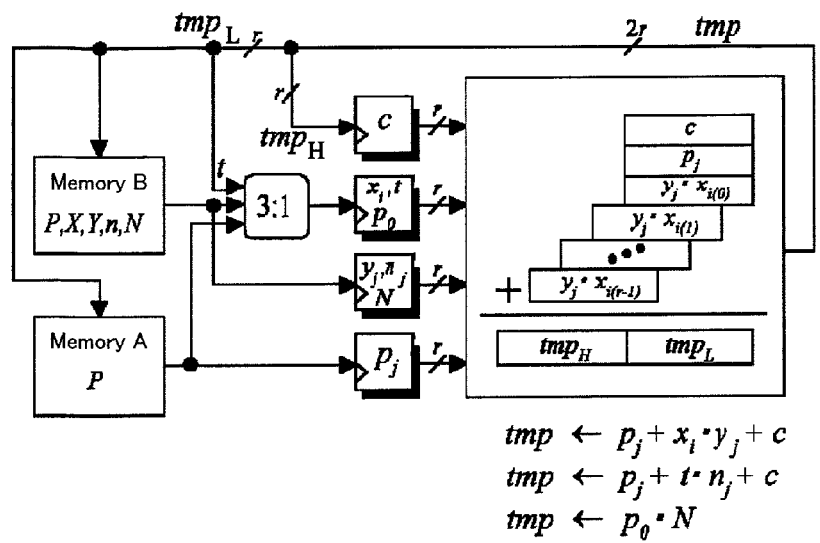
FIG. 10 is a block diagram showing an example of a general configuration of the conventional arithmetic circuit.

FIG. 8 shows a flow of the first subloop process of the invented circuit 1. As understood from FIGS. 7 and 8, the invented circuit 1 can execute the sum-of-products calculation process by the sum-of-products calculation circuit 10 while at the same time executing the write process in the first memory M1 and the carry register R2. Therefore, one loop cycle can be formed by two cycles including a memory read cycle to execute the second read process for inputting each variable to the sum-of-products calculation circuit 10 and a memory write cycle to execute the write process for writing the previous calculation result of the sum-of-products calculation circuit 10 in the first memory M1 and the carry register R2 and to execute the sum-of-products calculation process. Thus, as compared with the conventional technique of FIG. 11 in which one loop cycle is formed by three or four cycles, the arithmetic process can be executed at a higher speed.

As understood from FIG. 2, the RSA encryption circuit 103 according to this embodiment repeatedly performs the Montgomery multiplication. The Montgomery multiplication, if performed by the invented circuit 1 can be carried out using only a one-port RAM, thereby making it possible to realize a highly versatile RSA encryption circuit 103 without depending on the ASIC library. Also, as described above, the invented circuit 1 can increase the arithmetic processing speed as compared with the conventional arithmetic circuit for Montgomery multiplication, and therefore, the RSA encryption circuit 103 for repeating the Montgomery multiplication can be increased in operation speed. In other words, the invented circuit 1 is usefully applicable especially to an encryption circuit or an arithmetic circuit that performs the Montgomery multiplication a number of times repeatedly.

Other Embodiments (1) According to the embodiment described above, the RSA encryption circuit 103 is included in the IC card 100, and the encryption process is executed using the invented circuit 1. Alternatively, the RSA encryption circuit 103, etc. included in an IC card reader, etc. may be configured to execute the decryption process using the invented circuit 1.

(2) Unlike in the aforementioned embodiment using the invented circuit 1 for the RSA encryption circuit 103, the invented circuit 1 may be employed in another encryption circuit or arithmetic circuit using the Montgomery multiplication.

Although the present invention has been described in terms of the preferred embodiment, it will be appreciated that various modifications and alternations might be made by those skilled in the art without departing from the spirit and scope of the invention. The invention should therefore be measured in terms of the claims which follow.

What is claimed is:

1. An arithmetic circuit for performing Montgomery multiplication, comprising:
   a sum-of-products calculation circuit adapted to execute a sum-of-products calculation process to accept first, second, third and fourth variables of a bit width r, and calculate a sum of the third variable, a product of the first and second variables, and the fourth variable thereby to output calculation result data of a bit width 2r;
   a first memory configured by a synchronous one-port RAM having a storage area for storing an intermediate result storage array of a bit width r with a number s of elements, and adapted to output each element of the intermediate result storage array as the third variable to the sum-of-products calculation circuit;
   a second memory configured by a synchronous one-port RAM having a storage area for storing first and second arrays of a bit width r with a number s of elements, and adapted to output each element of the first array as the first variable to the sum-of-products calculation circuit;
   a multiplicand storage register adapted to accept and store the second array from the second memory in units of element, and output each element of the second array as the second variable to the sum-of-products calculation circuit; and
   a carry register adapted to accept and store most significant bit-side data including most significant r bits of the calculation result data, and output the most significant bit-side data as the fourth variable to the sum-of-products calculation circuit, the arithmetic circuit executing:
   a first read process for reading the elements of the second array indicated by a predetermined first loop counter value from the second memory, and storing the elements in the multiplicand storage register;
   a second read process for reading the elements of the first array indicated by a predetermined second loop counter value from the second memory, the elements of the intermediate result storage array indicated by the second loop counter value from the first memory, a value of the multiplicand storage register and a value of the carry register, and inputting each of the read out elements and values to the sum-of-products calculation circuit; and
   a write process for writing the most significant bit-side data in the carry register and least significant bit-side data including least significant r bits of the calculation result data in the first memory as the elements of the intermediate result storage array indicated by the second loop counter value, wherein the first read process is followed by a first subloop process for repeatedly executing the second read process, the sum-of-products calculation process, the write process and a process of updating the second loop counter value.

2. The arithmetic circuit according to claim 1, wherein the second memory further includes a storage area for storing a third array of a bit width r with a number s of elements and a multiplicand variable of a bit width r, and is adapted to output each element of the third array to the sum-of-products calculation circuit as each corresponding element of the first array, and output the multiplicand variable to the multiplicand storage register as each element of the second array.

3. The arithmetic circuit according to claim 2, wherein a second subloop process is executed to repeat the second read process using each element of the third array as each corresponding element of the first array, the sum-of-products calculation process, the write process and the process of updating the second loop counter value, and a main loop process is executed to repeat at least the normal first read process, the first subloop process, another first read process using the multiplicand variable as each element of the second array, the second subloop process and a process of updating the first loop counter value in that order.

4. A RSA (Rivest Shamir Adleman) encryption circuit executing
at least one of a RSA encryption process and a decryption processes thereof using the arithmetic circuit for Montgomery multiplication according to claim 1.

* * * * *